United States Patent
Gauvain et al.

(10) Patent No.: US 10,906,633 B2
(45) Date of Patent: Feb. 2, 2021

(54) FLIGHT CONTROL COMPUTER OF AN AIRCRAFT

(71) Applicant: Airbus Operations S.A.S., Toulouse (FR)

(72) Inventors: Jérôme Gauvain, Toulouse (FR); Lionel Bompart, Toulouse (FR); Daniel Lopez Fernandez, Blagnac (FR)

(73) Assignee: Airbus Operations S.A.S.

( * ) Notice: Subject to any disclaimer, the term of this patent is extended or adjusted under 35 U.S.C. 154(b) by 372 days.

(21) Appl. No.: 15/952,666

(22) Filed: Apr. 13, 2018

(65) Prior Publication Data
US 2018/0304994 A1    Oct. 25, 2018

(30) Foreign Application Priority Data

Apr. 19, 2017    (FR) ...................................... 17 53366

(51) Int. Cl.
*B64C 13/18*    (2006.01)
*G07C 5/08*    (2006.01)
(Continued)

(52) U.S. Cl.
CPC ........... *B64C 13/18* (2013.01); *G05D 1/0808* (2013.01); *G05D 1/0825* (2013.01);
(Continued)

(58) Field of Classification Search
CPC ... B64F 5/60; B60W 50/0025; B60W 50/023; B60W 50/029; B60W 50/02;
(Continued)

(56) References Cited

U.S. PATENT DOCUMENTS 4,590,475 A * 5/1986 Brown ................. G05D 1/0607
244/76 R
6,594,620 B1 * 7/2003 Qin .......................... G05B 9/02
702/183
(Continued)

FOREIGN PATENT DOCUMENTS

EP    3136197 A1    3/2017
FR    2988851 A1    10/2013

OTHER PUBLICATIONS

Hardier G. et al, Aerodynamic Model Inversion for Virtual Sensing of Longitudinal Flight Parameters:, 2013 Conference on Control and Fault-Tolerant Systems, IEEE, Oct. 9, 2013, pp. 140-145.
(Continued)

*Primary Examiner* — Thomas G Black
*Assistant Examiner* — Sara J Lewandroski
(74) *Attorney, Agent, or Firm* — Lerner, David, Littenberg, Krumholz & Mentlik, LLP

(57) ABSTRACT

A flight control computer of an aircraft is likely to operate in a so-called incidence protection mode in which it is configured to compute the deflection orders of an elevator as a function of incidence angle values supplied by a set of incidence probes, so as to keep the incidence angle of the aircraft within a range of acceptable incidence angle values. The flight control computer is configured to, when only one incidence probe is operational: compute a first estimated incidence angle value of the aircraft, by a first estimator and a second estimated incidence angle value of the aircraft, by a second estimator unlike the first estimator; and keep the incidence protection mode activated as long as the incidence angle value supplied by the single operational incidence probe is consistent with at least one out of the first estimated incidence angle value and the second estimated incidence angle value.

12 Claims, 2 Drawing Sheets

(51) Int. Cl.
   *G05D 1/08*   (2006.01)
   *B64F 5/60*   (2017.01)
(52) U.S. Cl.
   CPC ......... *G05D 1/0833* (2013.01); *G07C 5/0816* (2013.01); *B64F 5/60* (2017.01)
(58) Field of Classification Search
   CPC ..... B60W 50/0205; B60W 2050/0295; B60W 2050/0297; B60W 2050/021; B60W 2050/0215; G07C 5/0816
   See application file for complete search history.

(56) References Cited

U.S. PATENT DOCUMENTS

| | | | | |
|---|---|---|---|---|
| 2005/0043865 | A1* | 2/2005 | Seve | G01P 5/16 701/7 |
| 2005/0278085 | A1* | 12/2005 | Warkomski | G05D 1/107 701/6 |
| 2010/0100260 | A1* | 4/2010 | McIntyre | G01P 5/16 701/6 |
| 2013/0073124 | A1* | 3/2013 | Baillon | B64D 43/02 701/14 |
| 2013/0317691 | A1* | 11/2013 | Schott | G01P 21/00 701/30.3 |
| 2015/0012155 | A1* | 1/2015 | Mandle | G01P 5/165 701/14 |
| 2015/0052994 | A1* | 2/2015 | Dupont De Dinechin | G01P 13/025 73/180 |
| 2015/0057960 | A1* | 2/2015 | Dupont De Dinechin | G01P 5/16 702/98 |
| 2015/0148997 | A1* | 5/2015 | Brot | G01P 21/025 701/3 |
| 2016/0102994 | A1* | 4/2016 | Brenner | G07C 5/0808 701/7 |
| 2016/0114903 | A1* | 4/2016 | Claudel | B64D 45/00 701/3 |
| 2016/0122000 | A1* | 5/2016 | Mahmulyin | G05D 1/0066 244/230 |
| 2016/0274739 | A1* | 9/2016 | Lepage | G01C 23/005 |
| 2017/0060141 | A1* | 3/2017 | Leopold | G05D 1/0833 |
| 2017/0113786 | A1* | 4/2017 | Beaufrere | B64C 13/0425 |
| 2017/0137116 | A1* | 5/2017 | Ireland | F04D 29/324 |
| 2017/0358152 | A1* | 12/2017 | Atalla | B64C 13/505 |
| 2018/0088593 | A1* | 3/2018 | De Tarso Ferreira | G05D 1/0661 |
| 2018/0275651 | A1* | 9/2018 | Prosser | G05D 1/0061 |

OTHER PUBLICATIONS

FR 1753366 Search Report dated Jan. 10, 2018.

\* cited by examiner

FLIGHT CONTROL COMPUTER OF AN AIRCRAFT

FIELD OF THE INVENTION

The invention relates to a flight control computer of an aircraft, provided to control surfaces of the aircraft.

BACKGROUND OF THE INVENTION

Modern aircraft, in particular transport aeroplanes, comprise a set of flight control computers which compute deflection orders for control surfaces of the aircraft that they transmit to controllers of actuators of said control surfaces of the aircraft. These control surfaces are for example flaps or ailerons situated on the wings of the aircraft, elevators situated for example on a horizontal plane at the rear of the aircraft, a rudder situated on the vertical stabiliser, etc. The flight control computers generally comprise a so-called incidence protection mode in which they compute the deflection orders for the elevators as a function of current incidence angle values of the aircraft, so as to keep the incidence angle of the aircraft within a range of acceptable incidence angle values. This range of acceptable incidence angle values is in particular determined to avoid a stalling of the aircraft. The incidence protection mode requires the availability, for the flight control computers, of aircraft incidence information. An aircraft is generally equipped with at least three incidence probes. The redundancy of the incidence probes makes it possible to manage the cases of failure of a part of the incidence probes, for example when said part of the incidence probes becomes blocked due to icing or the action of lightning. However, when fewer than two incidence probes are operational, the incidence protection mode is generally deactivated.

BRIEF SUMMARY OF THE INVENTION

It would be desirable to improve the availability of the incidence protection mode when several incidence probes have failed. The invention relates to a flight control computer of an aircraft configured to compute deflection orders for at least one elevator of the aircraft, the flight control computer being likely to operate in a so-called incidence protection mode in which it is configured to:
acquire incidence angle values of the aircraft supplied by a set of incidence probes of the aircraft; and
compute deflection orders for the at least one elevator as a function of said incidence angle values, so as to keep the incidence angle of the aircraft within a range of acceptable incidence angle values.

The flight control computer is noteworthy in that it is further configured to determine whether a single incidence probe is operational out of the incidence probes of the set of incidence probes of the aircraft and, if a single incidence probe is operational to:
compute a first estimated incidence angle value of the aircraft, by means of a first estimator;
computer a second estimated incidence angle value of the aircraft, by means of a second estimator unlike the first estimator;
determine whether an incidence angle value supplied by the single operational incidence probe is consistent with at least one out of the first estimated incidence angle value and the second estimated incidence angle value; and
keep the incidence protection mode activated as long as the incidence angle value supplied by the single operational incidence probe is consistent with at least one out of the first estimated incidence angle value and the second estimated incidence angle value.

Thus, the incidence protection mode can be kept activated even if a single incidence probe is operational, in as much as the incidence value supplied by this incidence probe is consistent with the estimated incidence angle value computed by means of one of the two estimators. The use of dissimilar estimators makes it possible to avoid a failure mode common to the two estimators.

In a preferred embodiment, the first estimator is likely to be disturbed by a first type of disturbance and the second estimator is likely to be disturbed by a second type of disturbance independent of the first type of disturbance. In particular, the first type of disturbance corresponds to a weight error of the aircraft and the second type of disturbance corresponds to the wind.

Advantageously, the first estimator is based on the resolution of the aircraft lift equation:

$$0.7 \cdot Ps \cdot M^2 \cdot S_{ref} \cdot C_z + T \cdot \sin(\alpha+\epsilon) = mg \cdot n_{z_a}$$

in which:
Ps is the static pressure of the air surrounding the aircraft
M is the Mach number of the aircraft
$S_{ref}$ is the reference surface of the wings of the aircraft
$C_z$ is the lift coefficient of the aircraft
T is the total thrust of the engines
$\alpha$ is the incidence angle of the aircraft
$\epsilon$ is the angle of inclination of the engines of the aircraft
m is the weight of the aircraft
g is the acceleration of gravity
$n_{z_a}$ is the component of the load factor along the aerodynamic vertical axis of the aircraft Even more advantageously, the second estimator is based on the resolution of the following angular equation:

$$\alpha = \frac{\theta - \beta \cdot \sin(\varphi) - \gamma_{air}}{\cos(\varphi)}$$

in which:
$\alpha$ is the incidence angle of the aircraft
$\theta$ is the pitch angle of the aircraft
$\beta$ is the side slip angle of the aircraft
$\varphi$ is the roll angle of the aircraft
$\gamma_{air}$ is the air gradient of the aircraft
In particular, $\gamma_{air}$ is determined by means of the following equation:

$$\gamma_{air} = \operatorname{atan}\left(\frac{Vz}{VTAS}\right)$$

in which:
Vz is the vertical speed of the aircraft
VTAS is the speed of the aircraft relative to the mass of air surrounding the aircraft (True Air Speed)

In a particular embodiment, the flight control computer is further configured to implement the following steps when only two incidence probes are operational out of the incidence probes of the set of incidence probes of the aircraft and these two incidence probes supply inconsistent incidence angle values of the aircraft:

determine whether an incidence angle value supplied by one of the two incidence probes is inconsistent with at least one out of the first estimated incidence angle value and the second estimated incidence angle value; and define as non-operational that of the two incidence probes for which the incidence angle value is inconsistent with at least one out of the first estimated incidence angle value and the second estimated incidence angle value.

In another particular embodiment, the flight control computer is further configured to implement the following steps when at least three incidence probes are operational out of the incidence probes of the set of incidence probes of the aircraft:

determine, for each of the at least three incidence probes, whether an incidence angle value supplied by this incidence probe is consistent with at least one out of the first estimated incidence angle value and the second estimated incidence angle value; and if there is at least one incidence probe for which the incidence angle value is consistent with at least one out of the first estimated incidence angle value and the second estimated incidence angle value, define as non-operational each incidence probe for which the incidence angle value is not consistent with the first estimated incidence angle value and is not consistent with the second estimated incidence angle value.

Advantageously, when each of the incidence angle values supplied by the incidence probes is not consistent with the first estimated incidence angle value and is not consistent with the second estimated incidence angle value, the flight control computer orders the activation of an alert in the cockpit of the aircraft and it keeps these incidence probes defined as operational.

The invention also relates to an aircraft comprising a flight control computer as specified above.

BRIEF DESCRIPTION OF THE DRAWINGS

The invention will be better understood on reading the following description and on studying the attached figures.

DETAILED DESCRIPTION

Figure 1:
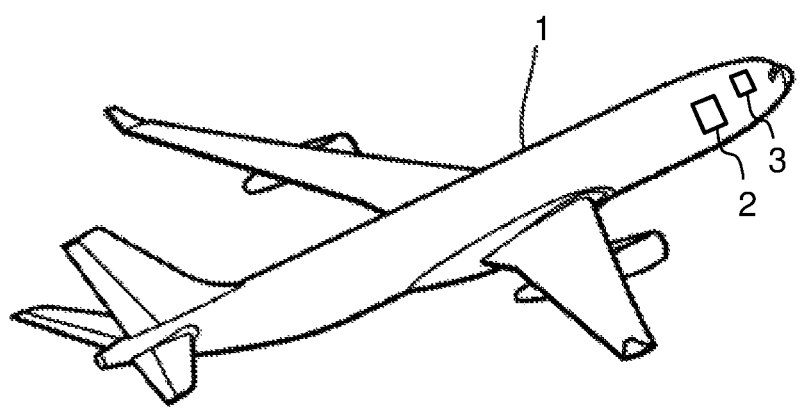
FIG. 1 is a simplified illustration of an aircraft comprising a cockpit.
Figure 2:
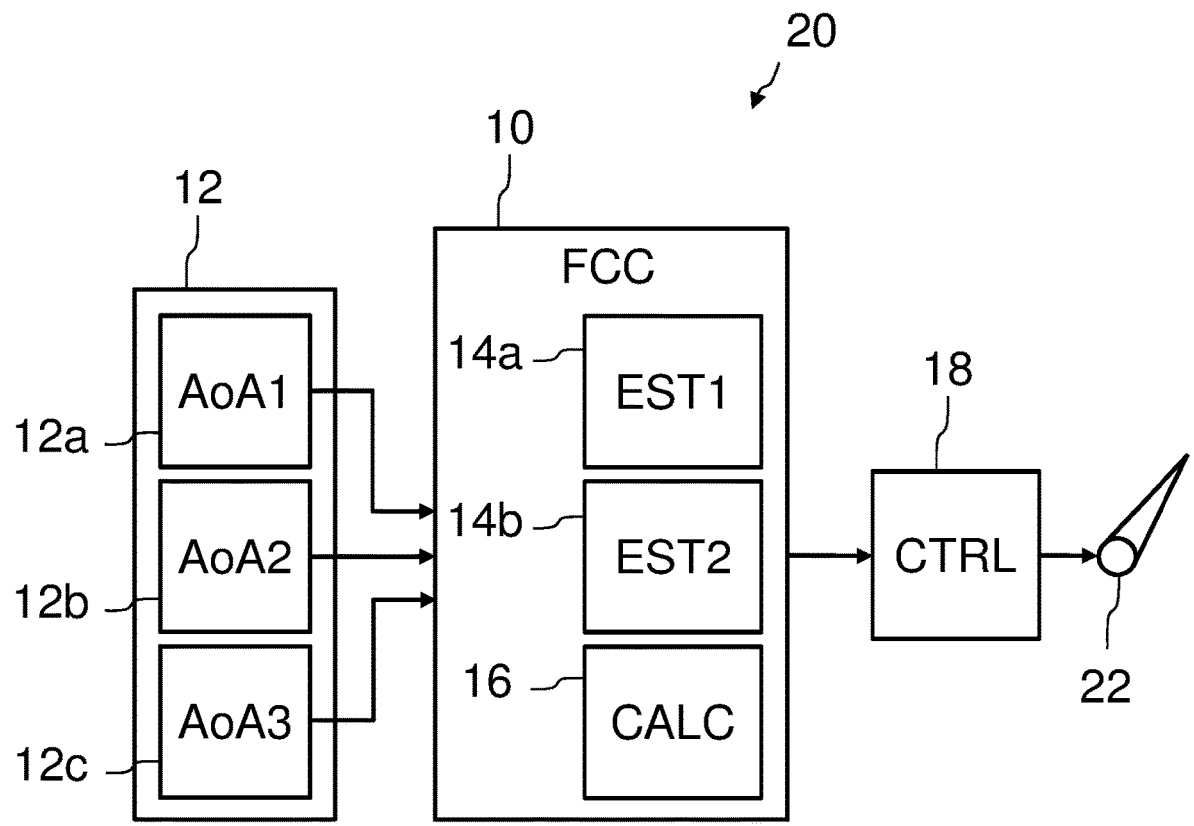
FIG. 2 schematically illustrates a flight control system of an aircraft comprising a flight control computer according to an embodiment of the invention.

The aircraft 1 represented in FIG. 1 comprises a flight control system 20 as represented in FIG. 2. This flight control system comprises a set of flight control computers such as the flight control computer 10, labelled FCC in the figure. This flight control computer is for example a primary flight control computer of the aircraft. It is for example situated in an avionics bay 2 of the aircraft. The aircraft comprises a set 12 of incidence probes, for example comprising three incidence probes 12a, 12b, 12c each located, in the usual manner, in an ADR (Air Data Reference) module of an ADIRU (Air Data Inertial Reference Unit). These incidence probes and the corresponding ADIRU units are labelled AoA1, AoA2 and AoA3 in the figure. The flight control system 20 also comprises a controller 18 (labelled "CTRL" in the figure) of actuators of at least one elevator 22 of the aircraft. The flight control computer 10 is linked at the input to the outputs of the ADIRU units corresponding to the three incidence probes 12a, 12b, 12c. It is linked at the output to the controller 18 of actuators of the elevator 22.

In operation, the flight control computer 10 receives piloting settings originating from piloting members (not represented in the figure) actuated by a pilot in a cockpit 3 of the aircraft or from an automatic piloting system of the aircraft. It calculates commands to be sent to the controller 18 of the actuators of the elevator 22 from information received from the piloting members (or from the automatic piloting system) and current flight parameters. These commands correspond to deflection orders for the elevator. The flight control computer 10 is designed to operate in a so-called incidence protection mode in which it calculates the deflection orders for the elevator so as to keep the incidence angle of the aircraft within a range of acceptable incidence angle values. In particular, this range of acceptable incidence angle values is determined so as to avoid a stalling of the aircraft. In the incidence protection mode, the flight control computer 10 acquires incidence angle values of the aircraft supplied by the incidence probes of the set of incidence probes 12 and it calculates the deflection orders for the elevator 22 as a function of said incidence angle values, so as to keep the incidence angle of the aircraft within the range of acceptable incidence angle values.

The flight control computer checks the mutual consistency of the incidence angle values supplied by the different incidence probes. If one of the incidence probes supplies incidence angle values that are inconsistent with the values supplied by the other incidence probes, the flight control computer considers this incidence probe as non-operational. The flight control computer calculates the deflection orders for the elevator 22 as a function of said incidence angle values on the basis of the incidence angle values supplied only by the incidence probes considered as operational, by excluding the incidence angle values supplied by the incidence probes considered as non-operational. According to the invention, when the flight control computer 10 determines that a single incidence probe is operational out of the incidence probes of the set 12 of the incidence probes of the aircraft, the flight control computer 10 performs the following operations:

it calculates a first estimated incidence angle value of the aircraft, by means of a first estimator, using a first software module 14a labelled EST1 in the figure;

it calculates a second estimated incidence angle value of the aircraft, by means of a second estimator unlike the first estimator, using a second software module 14b labelled EST2 in the figure;

it determines, using a third software module 16 labelled CALC in the figure, whether an incidence angle value supplied by the single operational incidence probe is consistent with at least one out of the first estimated incidence angle value and the second estimated incidence angle value; and it keeps the incidence protection mode activated as long as the incidence angle value supplied by the single operational incidence probe is consistent with at least one out of the first estimated incidence angle value and the second estimated incidence angle value. When the incidence angle value supplied by the single operational incidence probe is not consistent either with the first estimated incidence angle value or with the second estimated incidence angle value, the flight control computer 10 considers this incidence probe as non-operational, it deactivates the incidence protection mode and it emits an alert in the cockpit so as to inform a pilot of the aircraft of the deactivation of the incidence protection mode.

Thus, by virtue of the invention, the flight control computer keeps the incidence protection mode activated even when just one incidence probe is considered operational, in as much as the incidence angle value supplied by this single operational incidence probe is consistent with the first estimated incidence angle value and/or the second estimated incidence angle value. That is advantageous for the piloting of the aircraft since the aircraft thus remains protected against a risk of stalling.

In a first particular embodiment, the first estimator is based on the resolution of the aircraft lift equation:

$$0.7 \cdot Ps \cdot M^2 \cdot S_{ref} \cdot C_z + T \cdot \sin(\alpha + \epsilon) = mg \cdot n_{z_a}$$

in which:
Ps is the static pressure of the air surrounding the aircraft
M is the Mach number of the aircraft
$S_{ref}$ is the reference surface of the wings of the aircraft
$C_z$ is the lift coefficient of the aircraft
T is the total thrust of the engines
$\alpha$ is the incidence angle of the aircraft
$\epsilon$ is the angle of inclination of the engines of the aircraft
m is the weight of the aircraft
g is the acceleration of gravity
$n_{z_a}$ is the component of the load factor along the aerodynamic vertical axis of the aircraft.

In a second particular embodiment, that can be combined with the first particular embodiment, the second estimator is based on the resolution of the following angular equation:

$$\alpha = \frac{\theta - \beta \cdot \sin(\varphi) - \gamma_{air}}{\cos(\varphi)}$$

in which:
$\alpha$ is the incidence angle of the aircraft
$\theta$ is the pitch angle of the aircraft
$\beta$ is the side slip angle of the aircraft
$\varphi$ is the roll angle of the aircraft
$\gamma_{air}$ is the air gradient of the aircraft
Particularly, $\gamma_{air}$ is determined by means of the following equation:

$$\gamma_{air} = \mathrm{atan}\!\left(\frac{Vz}{VTAS}\right)$$

in which:
Vz is the vertical speed of the aircraft
VTAS is the speed of the aircraft relative to the mass of air surrounding the aircraft (True Air Speed).

The first estimator according to the first particular embodiment is above all likely to be disturbed by a first type of disturbance corresponding to an aircraft weight assessment error. The second estimator according to the second particular embodiment is above all likely to be disturbed by a second type of disturbance corresponding to the wind, in particular the vertical component of the wind. This second type of disturbance is independent of the first type of disturbance. Consequently, the two estimators are dissimilar and are likely to be disturbed only by two types of disturbances independent of one another. These two estimators do not therefore risk suffering a common failure having a single origin, which considerably reduces the risk of simultaneous failure of the two estimators. The association of the above mentioned two estimators for checking the consistency of the incidence angle values supplied by the single operational incidence probe consequently allows the flight control computer 10 to keep the incidence protection mode activated, guaranteeing a high level of reliability.

In a particular embodiment, to determine whether the incidence angle value supplied by the single operational incidence probe is consistent with an estimated incidence angle value, the third software module 16 calculates a deviation between the incidence angle value supplied by the single operational incidence probe and said estimated incidence angle value. If this deviation is below, as an absolute value, a predetermined incidence angle threshold, the third computation module 16 determines that the incidence angle value supplied by the single operational incidence probe is consistent with the estimated incidence angle value. Otherwise, it determines that the incidence angle value supplied by the single operational incidence probe is not consistent with the estimated incidence angle value.

Advantageously, the flight control computer 10 is further configured to perform the following operations when only two incidence probes are operational out of the incidence probes of the set 12 of incidence probes of the aircraft and these two incidence probes supply inconsistent incidence angle values of the aircraft:
determine whether an incidence angle value supplied by one of the two incidence probes is inconsistent with at least one out of the first estimated incidence angle value and the second estimated incidence angle value; and
define as non-operational that of the two incidence probes for which the incidence angle value is inconsistent with at least one out of the first estimated incidence angle value and the second estimated incidence angle value.

The use of the estimated incidence angle values thus makes it possible to arbitrate between the two incidence probes hitherto considered operational.

In a particular embodiment, the two incidence probes are considered to supply inconsistent incidence angle values of the aircraft when the absolute value of the deviation between the incidence angle values supplied by these two incidence probes is above a predetermined threshold. As indicated previously, in such a case, the flight control computer 10 determines whether an incidence angle value supplied by one of the two incidence probes is inconsistent with at least one out of the first estimated incidence angle value and the second estimated incidence angle value. For that, an incidence angle value supplied by one of the two incidence probes is considered inconsistent with an estimated incidence angle value if the absolute value of the deviation between, on the one hand, this incidence angle value supplied by the incidence probe and, on the other hand, said estimated incidence angle value is above half of said predetermined threshold. That makes it possible to guarantee that at least one of the two incidence probes is considered non-operational when the two incidence probes supply inconsistent incidence angle values of the aircraft.

Advantageously, the flight control computer 10 is further configured to perform the following operations when at least three incidence probes are operational out of the incidence probes of the set of incidence probes of the aircraft:
determine, for each of the at least three incidence probes, whether an incidence angle value supplied by this incidence probe is consistent with at least one out of the first estimated incidence angle value and the second estimated incidence angle value; and
if there is at least one incidence probe for which the incidence angle value is consistent with at least one out of the first estimated incidence angle value and the second estimated incidence angle value, define as nonoperational each incidence probe for which the incidence angle value is not consistent with the first estimated incidence angle value and is not consistent with the second estimated incidence angle value.

Thus, in the hypothesis in which two incidence probes would supply incorrect incidence angle values and in which the third incidence probe would supply a correct incidence angle value, the use of the estimated incidence angle values to check the consistency of the incidence angle values supplied by the incidence probes thus makes it possible to consider as non-operational said two incidence probes supplying incorrect incidence angle values. On the other hand, a conventional method based on a majority choice of incidence angle values would have the effect of considering as non-operational the single incidence probe supplying a correct incidence angle value.

In a particular embodiment, the flight control computer 10 determines that an incidence angle value supplied by one of the three incidence probes is consistent with an estimated incidence angle value if the absolute value of the deviation between, on the one hand, this incidence angle value supplied by the incidence probe and, on the other hand, the estimated incidence angle value is below a predetermined incidence angle threshold. When the absolute value of said deviation is above this predetermined threshold, the flight control computer 10 checks that the absolute value of said deviation remains above this predetermined threshold during a confirmation time before determining that the incidence angle value supplied by the incidence probe is inconsistent with the estimated incidence angle value. This confirmation time preferably lies between 2 minutes and 5 minutes.

Furthermore, in the particular case where each of the incidence angle values supplied by the incidence probes is not consistent with the first estimated incidence angle value and is not consistent with the second estimated incidence angle value, the flight control computer orders the activation of an alert in the cockpit and it keeps these incidence probes defined as operational. That makes it possible to avoid considering the different incidence probes as non-operational if the problem of consistency of the incidence angle values with the estimated incidence angle values originates from simultaneous failures of the two estimators. The activation of the alert in the cockpit makes it possible to inform the pilot of the situation in order for him or her to apply the appropriate procedures to check whether the incidence probes have failed or are operational.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control computer of an aircraft configured to compute deflection orders for at least one elevator of the aircraft, the flight control computer configured to operate in an incidence protection mode in which the flight computer is configured to:
acquire incidence angle values of the aircraft supplied by a set of incidence probes of the aircraft; and
compute deflection orders for the at least one elevator as a function of said incidence angle values, so as to keep the incidence angle of the aircraft within a range of acceptable incidence angle values,
wherein the flight control computer is further configured to determine whether a single incidence probe is operational out of the incidence probes of the set of incidence probes of the aircraft and, if a single incidence probe is operational, to:
compute a first estimated incidence angle of the aircraft, by a first estimator;
compute a second estimated incidence angle of the aircraft, by a second estimator unlike the first estimator;
determine whether an incidence angle value supplied by the single operational incidence probe is consistent with at least one out of the first estimated incidence angle and the second estimated incidence angle; and
keep the incidence protection mode activated as long as the incidence angle value supplied by the single operational incidence probe is consistent with at least one out of the first estimated incidence angle and the second estimated incidence angle.

2. The flight control computer according to claim 1, wherein the first estimator is likely to be disturbed by a first type of disturbance and the second estimator is likely to be disturbed by a second type of disturbance independent of the first type of disturbance.

3. The flight control computer according to claim 1, wherein the first estimator is based on the resolution of the aircraft lift equation:

$$0.7 \cdot Ps \cdot M^2 \cdot S_{ref} \cdot C_z + T \cdot \sin(\alpha + \epsilon) = mg \cdot n_{z_a}$$

in which:
Ps is the static pressure of the air surrounding the aircraft
M is the Mach number of the aircraft
$S_{ref}$ is the reference surface of the wings of the aircraft
$C_z$ is the lift coefficient of the aircraft
T is the total thrust of the engines
$\alpha$ is the incidence angle of the aircraft
$\epsilon$ is the angle of inclination of the engines of the aircraft
m is the weight of the aircraft
g is the acceleration of gravity
$n_{z_a}$ is the component of the load factor along the aerodynamic vertical axis of the aircraft.

4. The flight control computer according to claim 3, wherein the second estimator is based on the resolution of the following angular equation:

$$\alpha = \frac{\theta - \beta \cdot \sin(\varphi) - \gamma_{air}}{\cos(\varphi)}$$

in which:
$\alpha$ is the incidence angle of the aircraft
$\theta$ is the pitch angle of the aircraft
$\beta$ is the side slip angle of the aircraft
$\varphi$ is the roll angle of the aircraft
$\gamma_{air}$ is the air gradient of the aircraft.

5. The flight control computer according to claim 4, wherein $\gamma_{air}$ is determined by the following equation:

$$\gamma_{air} = \operatorname{atan}\left(\frac{Vz}{VTAS}\right)$$

in which:
Vz is the vertical speed of the aircraft
VTAS is the speed of the aircraft relative to the mass of air surrounding the aircraft.

6. The flight control computer according to claim 1, further configured to implement the following steps when only two incidence probes are operational out of the incidence probes of the set of incidence probes of the aircraft and the two incidence probes supply inconsistent incidence angle values of the aircraft:
determine whether an incidence angle value supplied by one of the two incidence probes is inconsistent with at least one out of the first estimated incidence angle value and the second estimated incidence angle value; and
define as nonoperational that one of the two incidence probes for which the incidence angle value is inconsistent with at least one out of the first estimated incidence angle value and the second estimated incidence angle value.

7. The flight control computer according to claim 1, further configured to implement the following steps when at least three incidence probes are operational out of the incidence probes of the set of incidence probes of the aircraft:
determine, for each of the at least three incidence probes, whether an incidence angle value supplied by the incidence probe is consistent with at least one out of the first estimated incidence angle value and the second estimated incidence angle value; and
if there is at least one incidence probe for which the incidence angle value is consistent with at least one out of the first estimated incidence angle value and the second estimated incidence angle value, define as nonoperational each incidence probe for which the incidence angle value is not consistent with the first estimated incidence angle value and is not consistent with the second estimated incidence angle value.

8. The flight control computer according to claim 1, wherein, when each of the incidence angle values supplied by the incidence probes is not consistent with the first estimated incidence angle value and is not consistent with the second estimated incidence angle value, the flight control computer orders the activation of an alert in the cockpit of the aircraft and keeps the incidence probes defined as operational.

9. An aircraft comprising a flight control computer according to claim 1.

10. The flight control computer according to claim 1, wherein the second estimator is based on the resolution of the following angular equation:

$$\alpha = \frac{\theta - \beta \cdot \sin(\varphi) - \gamma_{air}}{\cos(\varphi)}$$

in which:
$\alpha$ is the incidence angle of the aircraft
$\theta$ is the pitch angle of the aircraft
$\beta$ is the side slip angle of the aircraft
$\varphi$ is the roll angle of the aircraft
$\gamma_{air}$ is the air gradient of the aircraft.

11. The flight control computer according to claim 10, wherein $\gamma_{air}$ is determined by the following equation:

$$\gamma_{air} = \operatorname{atan}\left(\frac{Vz}{VTAS}\right)$$

in which:
Vz is the vertical speed of the aircraft
VTAS is the speed of the aircraft relative to the mass of air surrounding the aircraft.

12. A flight control computer of an aircraft configured to compute deflection orders for at least one elevator of the aircraft, the flight control computer configured to operate in an incidence protection mode in which the flight control computer is configured to:
acquire incidence angle values of the aircraft supplied by a set of incidence probes of the aircraft; and
compute deflection orders for the at least one elevator as a function of said incidence angle values, so as to keep the incidence angle of the aircraft within a range of acceptable incidence angle values,
wherein the flight control computer is further configured to determine whether a single incidence probe is operational out of the incidence probes of the set of incidence probes of the aircraft and, if a single incidence probe is operational, to:
compute a first estimated incidence angle value of the aircraft, by a first estimator;
compute a second estimated incidence angle value of the aircraft, by a second estimator unlike the first estimator;
determine whether an incidence angle value supplied by the single operational incidence probe is consistent with at least one out of the first estimated incidence angle value and the second estimated incidence angle value; and
keep the incidence protection mode activated as long as the incidence angle value supplied by the single operational incidence probe is consistent with at least one out of the first estimated incidence angle value and the second estimated incidence angle value,
wherein the first estimator is based on the resolution of the aircraft lift equation:

$$0.7 \cdot Ps \cdot M^2 \cdot S_{ref} \cdot C_z + T \cdot \sin(\alpha + \epsilon) = mg \cdot n_{z_a}$$

in which:
Ps is the static pressure of the air surrounding the aircraft
M is the Mach number of the aircraft
$S_{ref}$ is the reference surface of the wings of the aircraft
$C_z$ is the lift coefficient of the aircraft
T is the total thrust of the engines
$\alpha$ is the incidence angle of the aircraft
$\epsilon$ is the angle of inclination of the engines of the aircraft
m is the weight of the aircraft
g is the acceleration of gravity
$n_{z_a}$ is the component of the load factor along the aerodynamic vertical axis of the aircraft.

* * * * *